United States Patent
Chien

(10) Patent No.: US 7,418,140 B2
(45) Date of Patent: Aug. 26, 2008

(54) METHOD FOR AUTO-CROPPING A SCANNED IMAGE

(75) Inventor: Ace Chien, Hsinchu (TW)

(73) Assignee: Transpacific Optics LLC, Wilmington, DE (US)

( * ) Notice: Subject to any disclaimer, the term of this patent is extended or adjusted under 35 U.S.C. 154(b) by 13 days.

(21) Appl. No.: 11/468,843

(22) Filed: Aug. 31, 2006

(65) Prior Publication Data

US 2007/0058864 A1  Mar. 15, 2007

Related U.S. Application Data

(63) Continuation of application No. 09/408,161, filed on Sep. 28, 1999, now abandoned.

(51) Int. Cl.
G06K 9/48 (2006.01)
H04N 1/46 (2006.01)

(52) U.S. Cl. ................... 382/199; 358/505

(58) Field of Classification Search ........... 382/199, 382/266–270, 275, 282, 312, 318, 319; 358/474, 358/505, 515, 518; 345/620, 673
See application file for complete search history.

(56) References Cited

U.S. PATENT DOCUMENTS

| | | | |
|---|---|---|---|
| 4,931,881 A | 6/1990 | Matsui et al. | |
| 5,282,061 A | 1/1994 | Farrell | |
| 5,491,759 A | 2/1996 | Nagao et al. | |
| 5,572,603 A * | 11/1996 | Koike | ......... 382/199 |
| 5,596,655 A | 1/1997 | Lopez | |
| 5,781,665 A * | 7/1998 | Cullen et al. | ......... 382/254 |
| 5,845,018 A * | 12/1998 | Breish | ......... 382/276 |
| 5,850,298 A | 12/1998 | Narahara et al. | |
| 5,880,858 A | 3/1999 | Jin | |
| 5,900,953 A | 5/1999 | Bottou | ......... 358/540 |
| 5,901,253 A * | 5/1999 | Tretter | ......... 382/289 |
| 6,310,984 B2 | 10/2001 | Sansom-Wai et al. | |
| 6,360,026 B1 | 3/2002 | Kulkarni et al. | |
| 6,377,711 B1 * | 4/2002 | Morgana | ......... 382/274 |

FOREIGN PATENT DOCUMENTS

| | | |
|---|---|---|
| EP | 0732842 | 6/1993 |
| EP | 0549255 | 9/1996 |

* cited by examiner

Primary Examiner—Kanji Patel
(74) Attorney, Agent, or Firm—Perkins Coie LLP

(57) ABSTRACT

The present invention provides a method for dynamically refine the threshold values of R(Red), G(Green), B(Blue) colors for determining a borderline pixel in response to the values of a background image, thereby to precisely determine the borderlines of the Area of Interest (AOI). The method of the invention first searches the borderline pixels of a scanned image according to the standard differences of the R,G,B values of the pixels. Then, approximate the R,G,B threshold values of the borderline pixels by repeatedly averaging the current R,G,B values of the borderline pixels and the previous R,G,B threshold values until the difference is less than a predetermined value. The approximated R,G,B threshold values are set for the new R,G,B threshold values for determining the attribute of a pixel for subsequent prescanned images. Accordingly, the AOI can be automatically selected by reading the image circumscribed by the borderline pixels.

90 Claims, 4 Drawing Sheets

METHOD FOR AUTO-CROPPING A SCANNED IMAGE

CROSS-REFERENCE TO RELATED APPLICATIONS

The present application is a continuation of U.S. application Ser. No. 09/408,161 filed Sep. 28, 1999 now abandoned, which is incorporated by reference in its entirety.

BACKGROUND OF THE INVENTION

A. Field of the Invention

The present invention relates to a method for auto-cropping a scanned image, especially to a method which can dynamically refine the threshold values of R(Red), G(Green), B(Blue) colors for determining borderline pixels in response to the values of a background image, thereby to precisely determine the crop range.

B. Description of the Prior Art

A conventional method for auto-cropping a scanned image is performed after the process of prescan. The auto-crop technology involves in precisely distinguishing the Area of Interest (hereinafter referred to as AOI) from a background image by finding the borderlines of the AOI. Since the color of the background image is usually black, so the R,G,B values of a background pixel is supposed to be very close to one another. Ideally, the R,G,B values of a background pixel shall be all zeros. In contrast, the colors of the AOI is full of variety. And, the R,G,B values of the AOI pixels shall be non-uniform. Accordingly, it is easy to tell a background image pixel from an AOI pixel by checking the standard differences of its R,G,B values.

Conventionally, a detection procedure is performed by checking the R, G, B, values of each pixel row by row and column by column. In general, if the differences of the R,G,B values of a pixel exceeds a predetermined value, the pixel is determined to be an AOI pixel. If not, the pixel will be determined to be a background pixel. The borderlines of the AOI refer to the background pixels that circumscribes the AOI. To provide a criteria for determining the R,G,B values of a background pixel, the conventional technology applies constant R, G, B threshold values for distinguishing a background pixel from an AOI pixel.

However, the constant R,G,B threshold values can not provide sufficient information for distinguishing a background pixel from an AOI pixel under various circumstances. For instance, when the color of the original itself is darker than the background color, then the background image will be mistaken as part of the AOI if the R,G,B threshold values are set too high. On the other hand, if the R,G,B threshold values are set too low, the AOI pixels will be mistaken as background pixels. Eventually, the R,G,B threshold values determine the precision of auto-cropping.

In fact, distinguishing a background pixel from an AOI pixel is not straightforward. For one reason, the background image is a reflection image from the cover of the scanner. Usually the cover of the scanner is made of black material. When a light source emits light onto the black cover of the scanner, the reflection image of the black cover is suppose to be uniformly black. Nevertheless, once the black material is made of unqualified material or flawed in manufacture, the reflection image will generate unexpected results.

Moreover, the variety of scanner models and the types of light sources should also be considered. Since the intensity of the light will be getting stronger after power-on and then getting stable after a period of time, so the background image will not be uniformly black if scanned during the warm-up process. In such case, if the scanner need to run a warm-up process after power-on or the light source is unstable, then the light intensity of a scanned image will be unevenly distributed. In addition, it is also possible that the color of the original itself may be darker than the color of the cover. Consequently, it is difficult to tell a background pixel from an AOI pixel based on constant R,G,B threshold values.

SUMMARY OF THE INVENTION

Accordingly, it is an object of the present invention to provide a method for auto-cropping a scanned image which can dynamically refine the threshold values of R(Red), G(Green), B(Blue) colors for determining borderline pixels in response to the values of a background image, so as to precisely select the image of the area of interest.

It is another object of the present invention to provide a method for intelligently selecting the image of the area of interest from a variety of uniform background colors so that the cover of the scanner can be coated with any uniform color other than black.

It is still yet another object of the present invention to provide an automatic learning process for the image scanner so as to efficiently learn the information about the RGB threshold values and the background color in the prescan procedures. Consequently, the process of auto-cropping can be performed more precisely after a few times of learning process which will no longer be required as soon as the RGB values have been approximated to the RGB threshold.

In accordance with the present invention, the inventive method comprising the steps of: first search the borderline pixels of a scanned image according to the standard difference of the R,G,B values of the pixels. Then, approximate the R,G,B threshold values of the borderline pixels by repeatedly averaging the current R,G,B values of the borderline pixels and the previous R,G,B threshold values until the difference is less than a predetermined value. The approximated R,G,B threshold values are set as the new R,G,B threshold values for determining the attribute of a pixel for subsequent prescanned images. Accordingly, the AOI image can be automatically cropped by reading the image circumscribed by the borderline pixels.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

A preferred embodiment of the invention is described below. This embodiment is merely exemplary. Those skilled in the art will appreciate that changes can be made to the disclosed embodiment without departing from the spirit and scope of the invention.

Figure 1:
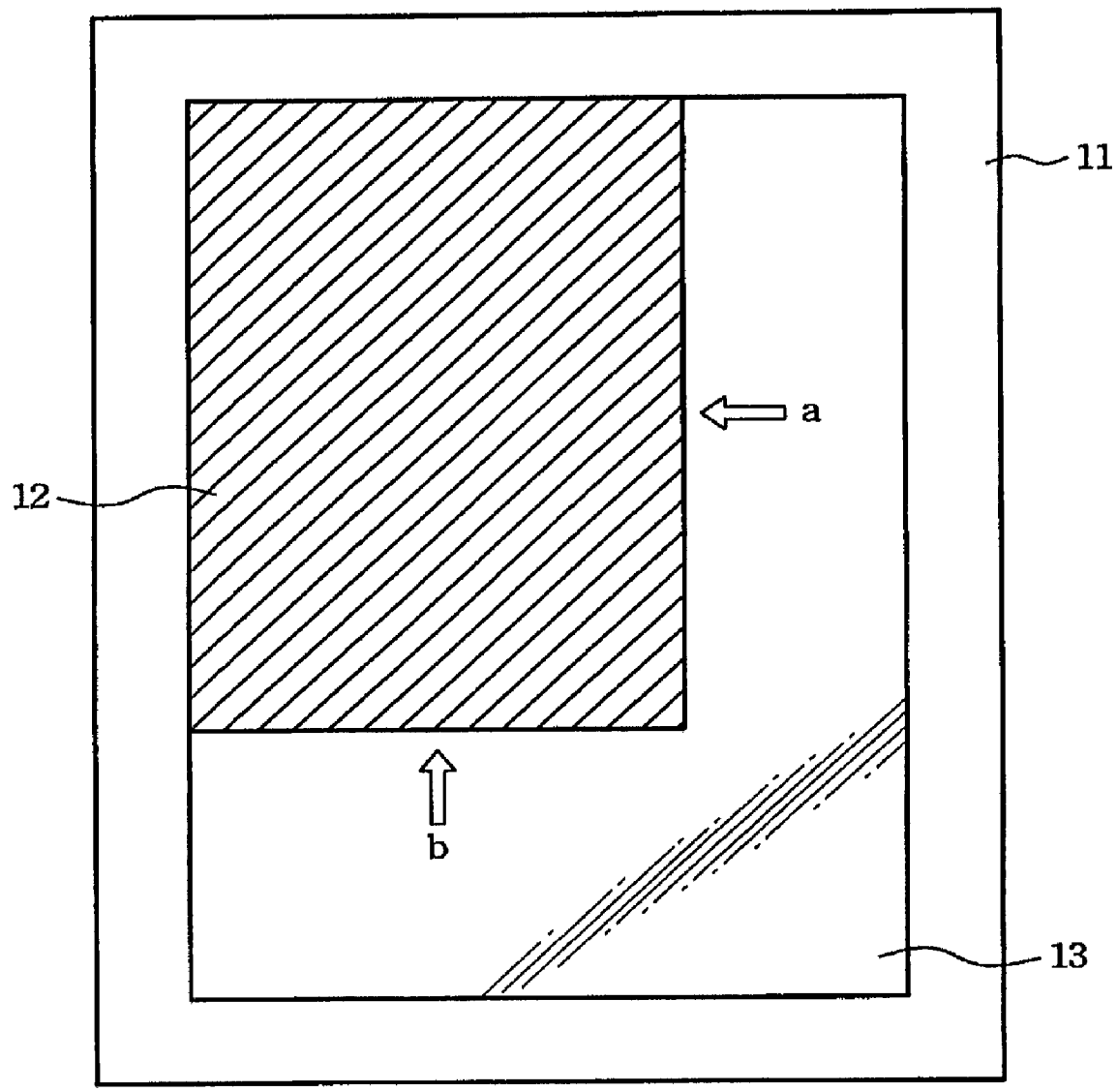
FIG. 1 is a schematic diagram showing the method for searching the borderline pixels circumscribing the AIO image.

Refer to FIG. 1, the present invention first search the borderline pixels that circumscribe the AOI image. As illustrated in FIG. 1, when operating the scanner, the original 12 is put on top of the sheet table 11 in a manner that two edges of the original are aligned with the two sides of the sheet table 11. Thus, the borderlines which need to be determined are only on the other two edges a and b. Consequently, the invention aims to find the R,G,B threshold values that can precisely determine the borderlines a and b for the AOI image.

The initial detection is only to find-the current R,G,B average values of the borderlines a and b. Accordingly, sequentially read the pixels from left to right and compare the standard differences of the R,G,B values of each pixel on the first row of the scanned image. The standard difference refers to the difference between one of the R,G,B values and a standard value. If the standard differences of R,G,B values are all smaller than a predetermined value, such as 10, then the pixel is determined to be a candidate borderline pixel. Then, continue to check all the pixels on the same column as the candidate borderline pixel to determine if the standard differences of R,G,B values for each pixel in the column are all smaller than the predetermined value. If yes, the column of the candidate borderline pixel indicates a borderline a. Then, stop searching borderline a.

If not, select next pixel on the same row of the candidate borderline pixel and perform the same test. The process repeats until a borderline a is found. For searching the borderline b, the procedure is the same. The difference is only that the test is on the first column rather on the first row, and the search sequence is from top to bottom rather from left to right.

Figure 2:
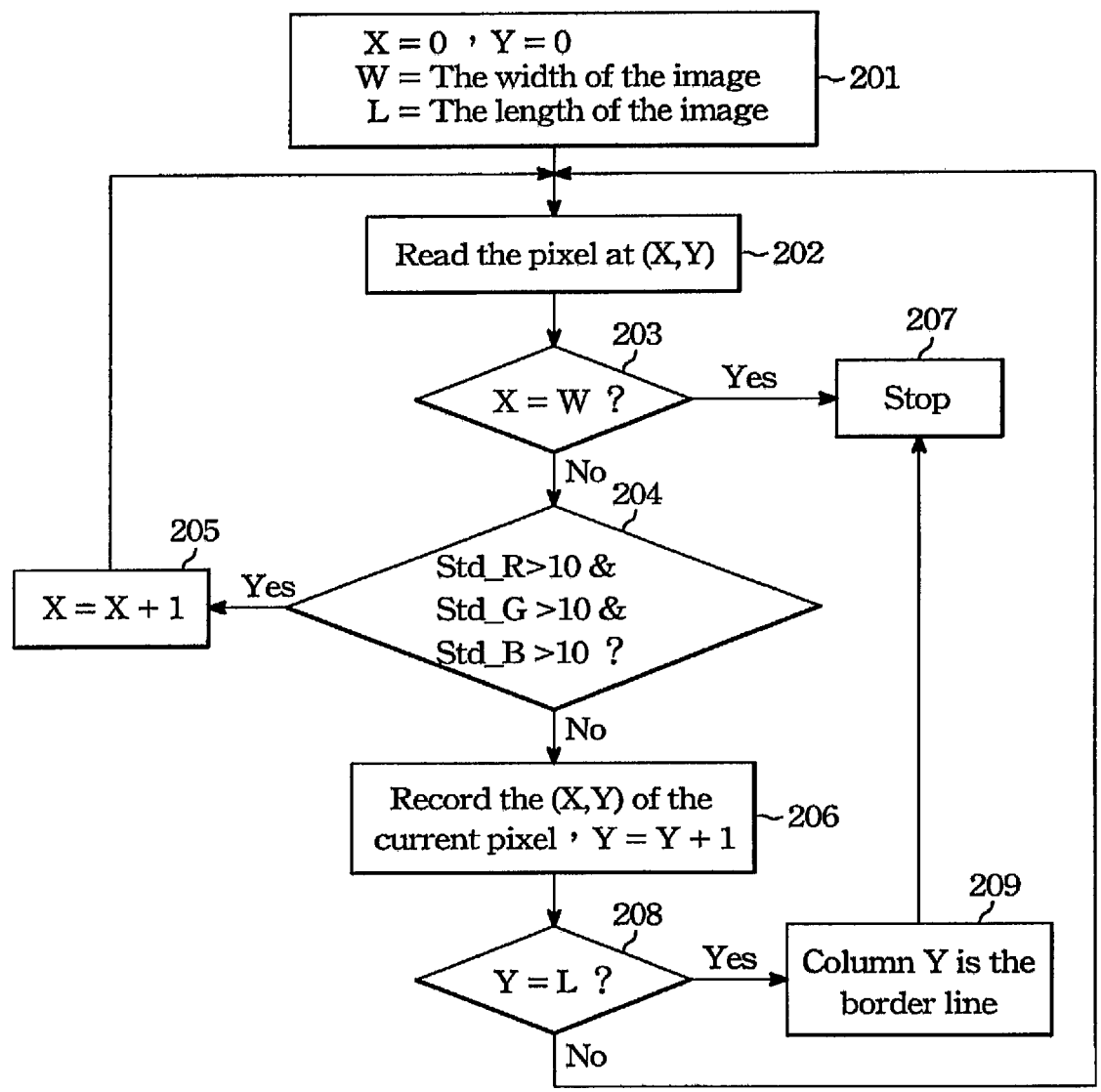
FIG. 2 is a flowchart showing the method for searching the borderline pixels circumscribing the AIO image.

Refer to FIG. 2 for showing the detailed method for looking the boundary a.

201: Set X=0, Y=0. W=the width of the scanned image, L=the length of the scanned image.

202: Read the pixel on coordinates (X, Y),

203: Determine if X=W? If yes, go to step 207. If not, go to step 204.

204: Determine if the R,G,B standard differences of the pixel on (X,Y) position is larger than a predetermined value, such as 10? If yes, go to step 205. If not, go to step 206.

205: Since the R,G,B standard differences of the current pixel are too large, so determine the current pixel on (X,Y) as an AOI pixel, and check next pixel, X=X+1. Then, go to step 202.

206: Since the R,G,B standard differences of the current pixel are too small, so determine the current pixel on (X, Y) as a background pixel. Then, record the coordinates of the current pixel to check the next pixel on the same column, Y=Y+1. Then, go to step 202.

207: Stop.

208: Determine if Y=L? If yes, go to step 209. If not, go to step 207.

209: Determine that the column of the current pixel is a borderline a. And go to step 207.

The method for determining the boundary b can follow the same scenario Moreover, if the original is not well-aligned with the two sides of the sheet table, the detection method of FIG. 2 is still applicable by a few modification known to the people skilled in the art.

After finding the borderlines a and b for the original, the initial threshold value for the R,G,B values of a pixel can be determined by averaging the values of each R,G,B channel for all borderline pixels. The average values for R, G, B channels can be represented as:

$$\mathrm{AVG\_R} = \left(\sum_1^n R\right)\bigg/n,\ \mathrm{AVG\_G} = \left(\sum_1^n G\right)\bigg/n,\ \mathrm{AVG\_B} = \left(\sum_1^n B\right)\bigg/n.$$

The average values for R, G, B for all the borderline pixels of side a and b are represented by AVG_R, AVG_G, AVG_B. The n represents the total number of pixels on the borderline.

Figure 3:
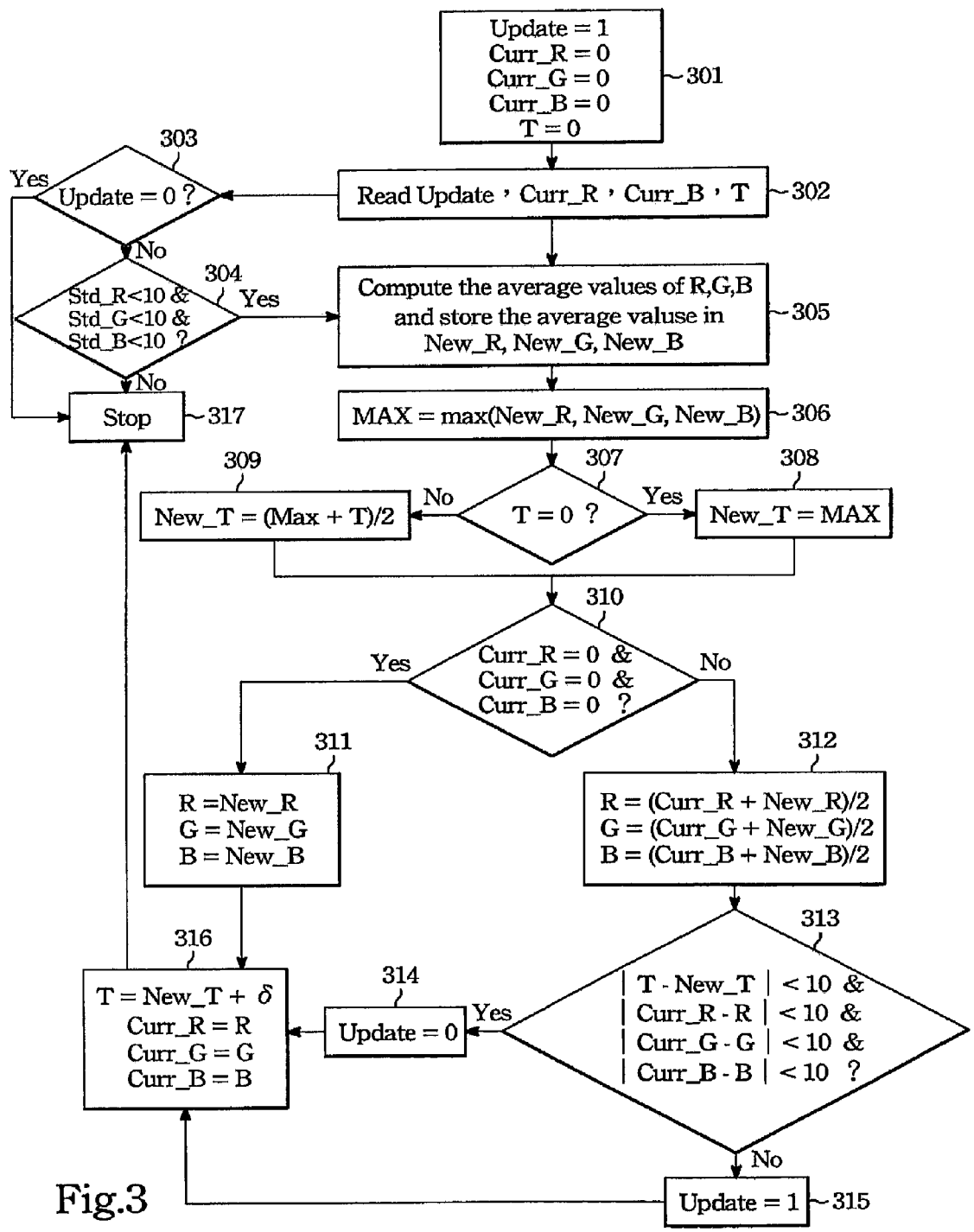
FIG. 3 is a flowchart showing the method for dynamically updating the R,G,B threshold values by approximation according to the method of the present invention.

Then, the current R, G, B threshold values, represented as Curr_R, Curr_G, and Curr_B, are averaged with the initial R, G, B average values AVG_R, AVG_G, AVG_B. That is, (AVG_R+Curr_R)/2, (AVG_G+Curr_G)/2, (AVG_B+Curr_B)/2. Then, store each of the temporary R,G,B average values in the memory of New_R, New_G, New_B as R, G, B threshold values for determining the background pixels in the subsequent prescanned image. Thus, repeat the same procedure until the R, G, B threshold values are approaching to the accurate values. The process is very similar to a learning process. Although the R, G, B threshold values for the background pixel is different from time to time for every prescan, it will soon approach the accurate value after a few times of prescan when the scanner is just initialized. The object is to prevent from mistakenly take the background pixel as the AOI pixel. Although the R,G,B threshold values will be averaged for every prescan, the time required for computing R,G,B average values will not slow down the process of prescan. Moreover, since the R,G,B threshold values for determining the borderline pixels are dynamically updated, the method is applicable to any background color other than black as long as its color is uniform, Refer to FIG. 3 for showing the steps of dynamically updating R, G, B threshold values. The present invention provides three reference values for dynamically updating R, G, B threshold values, including Update (a flag), R,G,B threshold values (represented by T), and R, G, B average value (represented by Curr_R, Curr_G, Curr_B, respectively). When Update=1, it indicates that the R,G,B threshold values T needs to be updated. When Update=0, it indicates that the R,G,B threshold values T is very close to the actual value, so the approximation can stop. The T is a memory device for temporarily storing the R, G, B threshold values after each computation. The Curr_R, Curr_G, and Curr_B are also memory devices for storing the R,G,B average values respectively.

301: Initialize Update, T, and Curr_R, Curr_G, Curr_B. Set Update=1, T=0, Curr_R=0, Curr_G=0, Curr_B=0.

302: In the process of prescan, read the values of Update, T and Curr_R, Curr_G, and Curr_B.

303: Determine if Update=0? If yes, it indicates that Curr_R, Curr_G, Curr_B is very close to the value of T. So, go to step 317 and stop. If not, go to step 304.

304: Determine if the standard differences (Std_R, Std_G, Std_B) of the R,G,B values of a current pixel are smaller than a predetermined value, such as 10? If yes, it indicates that the current pixel may be a background pixel, so go to step 305. If not, go to step 317.

305: Update=1, and the standard differences of the R,G,B values are smaller than the predetermined value, so the current pixel is determined to be a background pixel. Then, compute the average value of each R, G, B channel of all the pixels on the same column of the current pixel. Then, store the newly computed average values of R,G,B channels in the New_R, New_G, New_B memory devices respectively, 306: Pick the largest value stored in New_R, New_G, New_B ans store it in Max, a memory device.

307: Determine if T=0? If yes, it indicates this is the first time for computing the average values of the R,G,B channels of all the pixels of the borderline. So go to step 308. If not, go to step 309.

308: Store the Max value found in step 306 in New_T. Then, go to step 310.

309: Averaging the values stored in Max and T and then store the average value in New_T.

310: Determine if the R, G, B average values stored in Curr_R, Curr_G, Curr_B is equal to 0? If yes, go to step 311. If not, go to step 312.

311: It indicates that it is the first time that compute the average value of the R,G,B threshold values. So, assign the R,G,B average values stored in New_R, New_G, and New_B to R, G, B memory devices respectively. Then, go to step 316.

312: Since the R,G,B average values are not close enough to the accurate values, so compute the average values for the current R,G,B average values stored in Curr_R, Curr_G, Curr_B and the previous R,G,B average values stored in New_R, New_G, and New_B. Then, store the average results in R,G,B memory devices respectively.

313: Compute the difference of the values stored in T and New_T and then determine if the difference is smaller than a predetermined value, such as 10. And also determine if the difference between R and Curr_R, and the difference between G and Curr_G, and the difference between B and Curr_B are all smaller than a predetermined number, such as 10. If yes, go to step 314. If not, go to step 315.

314: Since the differences are all smaller than a predetermined value, so the approximated value shall be very close to the accurate value. Then, set Update=0 to stop approximation. And go to step 316.

315: Since the differences are all larger than a predetermined value, it indicates that the current threshold values still need to be approximated. So, go to step 316.

316: Store the sum of the R,G,B threshold values stored in New_T and a default weight δ in a memory device T. Store the values of R,G,B in the memory devices of Curr_R, Curr_G, and Curr_B.

317: Terminate the approximation of the R,G,B threshold values for this prescan. That is, the process of learning can be terminated.

Every time when the prescan is performed, the above mentioned R,G,B threshold values have to be approximated until the R,G,B threshold values is close to the actual R,G,B average values. Moreover, the processes from step 307 to step 310 and the processes from step 310 to step 313 is repeatedly iterated, thereby to obtain approximation value for the actual R,G,B average values. With the approximated R,G,B threshold values, the pixels of the borderlines can be defined more precisely. In fact, the learning process as described above is very efficient. When the scanner is just initiated, the approximation values for the actual RGB values can be obtained soon after 3 or 5 times of prescans. And the learning process can be terminated as soon as the RGB values have been approximated to the actual RGB values. The learning process will no longer be required in the subsequent scanning processes. The major difference between the present invention and other approaches is that the learning process stops as soon as the approximated RGB values have obtained. The learning process does not need to be performed for every prescan.

Figure 4:
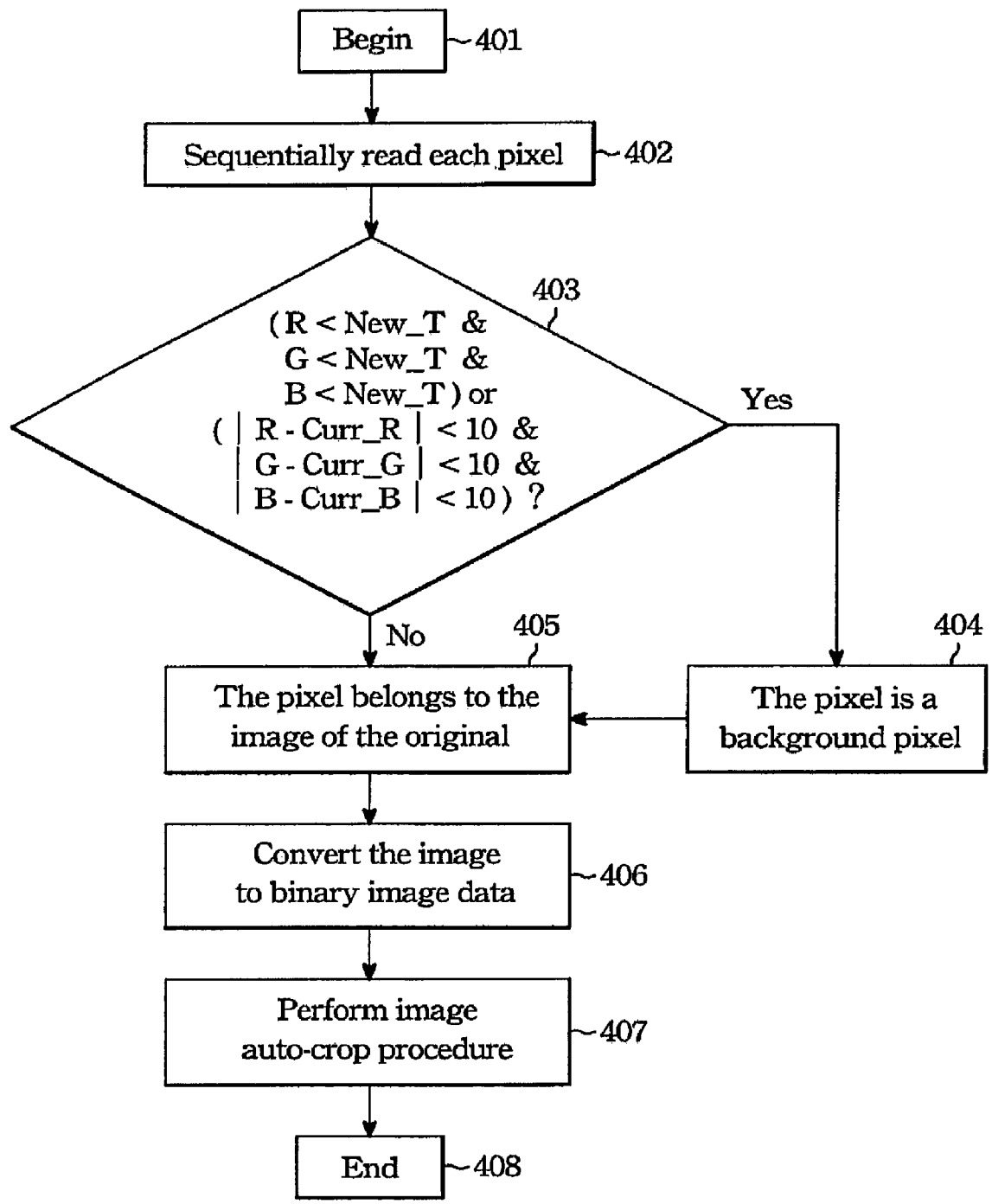
FIG. 4 is a flowchart showing the method for auto-cropping an AOI image based on the approximated R,G,B threshold values.

Refer to FIG. 4 for showing the method for selecting the AOI image based on the approximated R,G,B threshold values.

401: start.

402: Sequentially read each pixel of the scanned image.

403: Determine if the differences of the R,G,B values of a current pixel is smaller than the approximated R,G,B threshold values stored in T? Or, if the differences of the current R,G,B average values stored in New_R, New_G, New_B and the previous R,G,B average values stored in Curr_R, Curr_G, and Curr_B are smaller than a predetermined value? If yes, go to step 404. If not, go to step 405.

404: Determine if the current pixel is a background pixel and then mark the position of the current pixel.

405: Determine the current pixel is an AOI pixel.

406: Convert the image data into binary image data after the borderline pixels are all determined.

407: Reading AOI image according to the positions of the marked pixels.

408: stop.

To sum up, the invention can determine the borderline pixels circumscribing the AOI image more precisely because the R,G,B threshold values are based on approximated R,G,B values rather than a constant R,G,B values. The approximated R,G,B values are repeatedly approximated based on a current background image situation. Consequently, the present invention can be adaptable to various models of scanners, and light sources, and also to any uniform color other than black as a background color.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A method for auto-cropping a scanned image comprising:
   determining a location of one or more candidate borderline pixels of the scanned image;
   approximating average values for R,G,B channels for the one or more candidate borderline pixels based at least in part on R,G,B values for one or more corresponding borderline pixels of one or more previously scanned images, and setting the approximated R,G,B average values as R,G,B threshold values;
   determining that a candidate borderline pixel is a borderline pixel when the R,G,B values of the pixel are smaller than the R,G,B threshold values; and
   cropping the scanned image within a crop range defined by the one or more borderline pixels.

2. The method of claim 1 further comprising retrieving borderline pixel data from one or more previously scanned images.

3. The method of claim 1 further comprising using the borderline pixel data to determine borderline pixel data for one or more subsequently scanned images.

4. The method of claim 1 further comprising recording the location of the one or more borderline pixels when the R,G,B levels of the pixel are smaller than the R,G,B threshold values.

5. The method of claim 1 further comprising repeating said determining that a candidate borderline pixel is a borderline pixel for one or more candidate borderline pixels of the scanned image.

6. The method of claim 1 further comprising approximating the R,G,B average values for the one or more candidate borderline pixels by averaging candidate borderline pixel R,G,B values with R,G,B values for one or more corresponding borderline pixels of one or more previously scanned images.

7. The method of claim 1 further comprising determining whether the R,G,B average values of the pixel and R,G,B average values of one or more corresponding pixels of one or more previously scanned images are smaller than a predetermined value.

8. The method of claim 7 further comprising updating the threshold R,G,B values by a sum of the approximated R,G,B average values and a weight default value when the R,G,B average values and R,G,B average values of one or more corresponding pixels of one or more previously scanned images are smaller than a predetermined value.

9. The method of claim 1 further comprising determining whether the threshold R,G,B values of the pixel and threshold R,G,B values of one or more corresponding pixels of one or more previously scanned images are smaller than a predetermined value.

10. The method of claim 9 further comprising updating the threshold R,G,B values by a sum of the approximated R,G,B average values and a weight default value when the threshold R,G,B values and threshold R,G,B values of one or more corresponding pixels of one or more previously scanned images are smaller than a predetermined value.

11. The method of claim 1 further comprising sequentially approximating average values for R,G,B channels for one or more candidate borderline pixels located in a same row in the image as the borderline pixel based on R,G,B values for one or more corresponding borderline pixels of one or more previously scanned images, and setting the approximated R,G,B average values as R,G,B threshold values.

12. The method of claim 1 further comprising sequentially approximating average values for R,G,B channels for one or more candidate borderline pixels located in a same column in the image as the borderline pixel based on R,G,B values for one or more corresponding borderline pixels of one or more previously scanned images, and setting the approximated R,G,B average values as R,G,B threshold values.

13. A method of dynamically refining the location of one or more borderline pixels of a scanned image, the method comprising:
identifying a candidate borderline pixel having R,G,B values from borderline pixel data from one or more previously scanned images;
finding a difference between the candidate borderline pixel R,G,B values and standard R,G,B values; and
determining that the candidate borderline pixel is a borderline pixel if the difference is smaller than a predetermined value.

14. The method of claim 13 further comprising finding a difference between R,G,B values for one or more candidate borderline pixels located in a same column in the image as the borderline pixel and standard R,G,B values.

15. The method of claim 13 further comprising finding a difference between R,G,B values for one or more candidate borderline pixels located in a same row in the image as the borderline pixel and standard R,G,B values.

16. The method of claim 13 further comprising approximating average values for R,G,B channels for the candidate borderline pixel based on R,G,B values for a corresponding borderline pixel of one or more previously scanned images, and setting the approximated R,G,B average values as R,G,B threshold values.

17. The method of claim 13 further comprising retrieving borderline pixel data from one or more previously scanned images.

18. The method of claim 13 further comprising using the borderline pixel data to determine borderline pixel data for one or more subsequently scanned images.

19. The method of claim 13 further comprising recording the location of the one or more borderline pixels when the R,G,B levels of the pixel are smaller than the R,G,B threshold values.

20. The method of claim 13 further comprising finding a difference between the candidate borderline pixel R,G,B values and standard R,G,B values for more than one candidate borderline pixels of the scanned image.

21. The method of claim 13 further comprising approximating the R,G,B average values for the one or more candidate borderline pixels by averaging candidate borderline pixel R,G,B values with R,G,B values for one or more corresponding borderline pixels of one or more previously scanned images.

22. The method of claim 13 further comprising determining whether the R,G,B average values of the pixel and R,G,B average values of one or more corresponding pixels of one or more previously scanned images are smaller than a predetermined value.

23. The method of claim 22 further comprising updating the threshold R,G,B values by a sum of the approximated R,G,B average values and a weight default value when the R,G,B average values and R,G,B average values of one or more corresponding pixels of one or more previously scanned images are smaller than a predetermined value.

24. The method of claim 13 further comprising determining whether the threshold R,G,B values of the pixel and threshold R,G,B values of one or more corresponding pixels of one or more previously scanned images are smaller than a predetermined value.

25. The method of claim 24 further comprising updating the threshold R,G,B values by a sum of the approximated R,G,B average values and a weight default value when the threshold R,G,B values and threshold R,G,B values of one or more corresponding pixels of one or more previously scanned images are smaller than a predetermined value.

26. A method for dynamically refining the location of one or more borderline pixels of a scanned image comprising:
determining a location of one or more candidate borderline pixels of the scanned image;
approximating average values for R,G,B channels for the one or more candidate borderline pixels based on R,G,B values for one or more corresponding borderline pixels of one or more previously scanned images, and setting the approximated R,G,B average values as R,G,B threshold values; and
determining that a candidate borderline pixel is a borderline pixel when the R,G,B levels of the pixel are smaller than the R,G,B threshold values.

27. The method of claim 26 further comprising sequentially approximating average values for R,G,B channels for one or more candidate borderline pixels located in a same row in the image as the borderline pixel based on R,G,B values for one or more corresponding borderline pixels of one or more previously scanned images, and setting the approximated R,G,B average values as R,G,B threshold values.

28. The method of claim 26 further comprising sequentially approximating average values for R,G,B channels for one or more candidate borderline pixels located in a same column in the image as the borderline pixel based on R,G,B values for one or more corresponding borderline pixels of one or more previously scanned images, and setting the approximated R,G,B average values as R,G,B threshold values.

29. The method of claim 26 further comprising retrieving borderline pixel data from one or more previously scanned images.

30. The method of claim 26 further comprising using the borderline pixel data to determine borderline pixel data for one or more subsequently scanned images.

31. The method of claim 26 further comprising recording the location of the one or more borderline pixels when the R,G,B levels of the pixel are smaller than the R,G,B threshold values.

32. The method of claim 26 further comprising finding a difference between the candidate borderline pixel R,G,B values and standard R,G,B values for more than one candidate borderline pixels of the scanned image.

33. The method of claim 26 further comprising approximating the R,G,B average values for the one or more candidate borderline pixels by averaging candidate borderline pixel R,G,B values with R,G,B values for one or more corresponding borderline pixels of one or more previously scanned images.

34. The method of claim 26 further comprising determining whether the R,G,B average values of the pixel and R,G,B average values of one or more corresponding pixels of one or more previously scanned images are smaller than a predetermined value.

35. The method of claim 34 further comprising updating the threshold R,G,B values by a sum of the approximated R,G,B average values and a weight default value when the R,G,B average values and R,G,B average values of one or more corresponding pixels of one or more previously scanned images are smaller than a predetermined value.

36. The method of claim 26 further comprising determining whether the threshold R,G,B values of the pixel and threshold R,G,B values of one or more corresponding pixels of one or more previously scanned images are smaller than a predetermined value.

37. The method of claim 36 further comprising updating the threshold R,G,B values by a sum of the approximated R,G,B average values and a weight default value when the threshold R,G,B values and threshold R,G,B values of one or more corresponding pixels of one or more previously scanned images are smaller than a predetermined value.

38. A computer-readable storage medium containing instructions stored thereon that, if executed, result in:
determining a location of one or more candidate borderline pixels of a scanned image;
approximating average values for R,G,B channels for the one or more candidate borderline pixels based on R,G,B values for one or more corresponding borderline pixels of one or more previously scanned images, and setting the approximated R,G,B average values as R,G,B threshold values;
determining that a candidate borderline pixel is a borderline pixel when the R,G,B levels of the pixel are smaller than the R,G,B threshold values; and
cropping the scanned image within a crop range defined by the one or more borderline pixels.

39. The computer-readable storage medium of claim 38 wherein the instructions, if executed, further result in retrieving borderline pixel data from one or more previously scanned images.

40. The computer-readable storage medium of claim 38 wherein the instructions, if executed, further result in using the borderline pixel data to determine borderline pixel data for one or more subsequently scanned images.

41. The computer-readable storage medium of claim 38 wherein the instructions, if executed, further result in recording the location of the one or more borderline pixels when the R,G,B levels of the pixel are smaller than the R,G,B threshold values.

42. The computer-readable storage medium of claim 38 wherein the instructions, if executed, further result in repeating said determining that a candidate borderline pixel is a borderline pixel for one or more candidate borderline pixels of the scanned image.

43. The computer-readable storage medium of claim 38 wherein the instructions, if executed, further result in approximating the R,G,B average values for the one or more candidate borderline pixels by averaging candidate borderline pixel R,G,B values with R,G,B values for one or more corresponding borderline pixels of one or more previously scanned images.

44. The computer-readable storage medium of claim 38 wherein the instructions, if executed, further result in determining whether the R,G,B average values of the pixel and R,G,B average values of one or more corresponding pixels of one or more previously scanned images are smaller than a predetermined value.

45. The computer-readable storage medium of claim 44 wherein the instructions, if executed, further result in updating the threshold R,G,B values by a sum of the approximated R,G,B average values and a weight default value when the R,G,B average values and R,G,B average values of one or more corresponding pixels of one or more previously scanned images are smaller than a predetermined value.

46. The computer-readable storage medium of claim 38 wherein the instructions, if executed, further result in determining whether the threshold R,G,B values of the pixel and threshold R,G,B values of one or more corresponding pixels of one or more previously scanned images are smaller than a predetermined value.

47. The computer-readable storage medium of claim 46 wherein the instructions, if executed, further result in updating the threshold R,G,B values by a sum of the approximated R,G,B average values and a weight default value when the threshold R,G,B values and threshold R,G,B values of one or more corresponding pixels of one or more previously scanned images are smaller than a predetermined value.

48. The computer-readable storage medium of claim 38 wherein the instructions, if executed, further result in sequentially approximating average values for R,G,B channels for one or more candidate borderline pixels located in a same row in the image as the borderline pixel based on R,G,B values for one or more corresponding borderline pixels of one or more previously scanned images, and setting the approximated R,G,B average values as R,G,B threshold values.

49. The computer-readable storage medium of claim 38 wherein the instructions, if executed, further result in sequentially approximating average values for R,G,B channels for one or more candidate borderline pixels located in a same column in the image as the borderline pixel based on R,G,B values for one or more corresponding borderline pixels of one or more previously scanned images, and setting the approximated R,G,B average values as R,G,B threshold values.

50. A computer-readable storage medium containing instructions thereon that, if executed, result in:
identifying a candidate borderline pixel having R,G,B values of a scanned image from borderline pixel data from a previously scanned image;
finding a difference between the candidate borderline pixel R,G,B values and standard R,G,B values; and determining that the candidate borderline pixel is a borderline pixel if the difference is smaller than a predetermined value.

51. The computer-readable storage medium of claim 50 wherein the instructions, if executed, further result in finding a difference between R,G,B values for one or more candidate borderline pixels located in a same column in the image as the borderline pixel and standard R,G,B values.

52. The computer-readable storage medium of claim 50 wherein the instructions, if executed, further result in finding a difference between R,G,B values for one or more candidate borderline pixels located in a same row in the image as the borderline pixel and standard R,G,B values.

53. The computer-readable storage medium of claim 50 wherein the instructions, if executed, further result in approximating average values for R,G,B channels for the candidate borderline pixel based on R,G,B values for a corresponding borderline pixel of one or more previously scanned images, and setting the approximated R,G,B average values as R,G,B threshold values.

54. The computer-readable storage medium of claim 50 wherein the instructions, if executed, further result in retrieving borderline pixel data from one or more previously scanned images.

55. The computer-readable storage medium of claim 50 further comprising instructions for using the borderline pixel data to determine borderline pixel data for one or more subsequently scanned images.

56. The computer-readable storage medium of claim 50 wherein the instructions, if executed, further result in recording the location of the one or more borderline pixels when the R,G,B levels of the pixel are smaller than the R,G,B threshold values.

57. The computer-readable storage medium of claim 50 wherein the instructions, if executed, further result in finding a difference between the candidate borderline pixel R,G,B values and standard R,G,B values for more than one candidate borderline pixels of the scanned image.

58. The computer-readable storage medium of claim 50 wherein the instructions, if executed, further result in approximating the R,G,B average values for the one or more candidate borderline pixels by averaging candidate borderline pixel R,G,B values with R,G,B values for one or more corresponding borderline pixels of one or more previously scanned images.

59. The computer-readable storage medium of claim 50 wherein the instructions, if executed, further result in determining whether the R,G,B average values of the pixel and R,G,B average values of one or more corresponding pixels of one or more previously scanned images are smaller than a predetermined value.

60. The computer-readable storage medium of claim 59 wherein the instructions, if executed, further result in updating the threshold R,G,B values by a sum of the approximated R,G,B average values and a weight default value when the R,G,B average values and R,G,B average values of one or more corresponding pixels of one or more previously scanned images are smaller than a predetermined value.

61. The computer-readable storage medium of claim 50 wherein the instructions, if executed, further result in determining whether the threshold R,G,B values of the pixel and threshold R,G,B values of one or more corresponding pixels of one or more previously scanned images are smaller than a predetermined value.

62. The computer-readable storage medium of claim 61 wherein the instructions, if executed, further result in updating the threshold R,G,B values by a sum of the approximated R,G,B average values and a weight default value when the threshold R,G,B values and threshold R,G,B values of one or more corresponding pixels of one or more previously scanned images are smaller than a predetermined value.

63. An apparatus for auto-cropping a scanned image comprising:
means for determining a location of one or more candidate borderline pixels of the scanned image;
means for approximating average values for R,G,B channels for the one or more candidate borderline pixels based on R,G,B values for one or more corresponding borderline pixels of one or more previously scanned images, and setting the approximated R,G,B average values as R,G,B threshold values;
means for determining that a candidate borderline pixel is a borderline pixel when the R,G,B levels of the pixel are smaller than the R,G,B threshold values; and
means for cropping the scanned image within a crop range defined by the one or more borderline pixels.

64. The apparatus of claim 63 further comprising means for retrieving borderline pixel data from one or more previously scanned images.

65. The apparatus of claim 63 further comprising means for using the borderline pixel data to determine borderline pixel data for one or more subsequently scanned images.

66. The apparatus of claim 63 further comprising means for recording the location of the one or more borderline pixels when the R,G,B levels of the pixel are smaller than the R,G,B threshold values.

67. The apparatus of claim 63 means for determining that a candidate borderline pixel is a borderline pixel is capable of repeating a determination for one or more candidate borderline pixels of the scanned image.

68. The apparatus of claim 63 further comprising means for approximating the R,G,B average values for the one or more candidate borderline pixels by averaging candidate borderline pixel R,G,B values with R,G,B values for one or more corresponding borderline pixels of one or more previously scanned images.

69. The apparatus of claim 63 further comprising means for determining whether the R,G,B average values of the pixel and R,G,B average values of one or more corresponding pixels of one or more previously scanned images are smaller than a predetermined value.

70. The apparatus of claim 69 further comprising means for updating the threshold R,G,B values by a sum of the approximated R,G,B average values and a weight default value when the R,G,B average values and R,G,B average values of one or more corresponding pixels of one or more previously scanned images are smaller than a predetermined value.

71. The apparatus of claim 63 further comprising means for determining whether the threshold R,G,B values of the pixel and threshold R,G,B values of one or more corresponding pixels of one or more previously scanned images are smaller than a predetermined value.

72. The apparatus of claim 71 further comprising means for updating the threshold R,G,B values by a sum of the approximated R,G,B average values and a weight default value when the threshold R,G,B values and threshold R,G,B values of one or more corresponding pixels of one or more previously scanned images are smaller than a predetermined value.

73. The apparatus of claim 63 further comprising means for sequentially approximating average values for R,G,B channels for one or more candidate borderline pixels located in a same row in the image as the borderline pixel based on R,G,B values for one or more corresponding borderline pixels of one or more previously scanned images, and setting the approximated R,G,B average values as R,G,B threshold values.

74. The apparatus of claim 63 further comprising means for sequentially approximating average values for R,G,B channels for one or more candidate borderline pixels located in a same column in the image as the borderline pixel based on R,G,B values for one or more corresponding borderline pixels of one or more previously scanned images, and setting the approximated R,G,B average values as R,G,B threshold values.

75. An apparatus for dynamically refining the location of one or more borderline pixels of a scanned image comprising:
    means for identifying a candidate borderline pixel having R,G,B values from borderline pixel data from a previously scanned image;
    means for finding a difference between the candidate borderline pixel R,G,B values and standard R,G,B values; and
    means for determining that the candidate borderline pixel is a borderline pixel if the difference is smaller than a predetermined value.

76. The computer implemented process of claim 75 further comprising finding a difference between R,G,B values for one or more candidate borderline pixels located in a same column in the image as the borderline pixel and standard R,G,B values.

77. The apparatus of claim 75 further comprising means for finding a difference between R,G,B values for one or more candidate borderline pixels located in a same row in the image as the borderline pixel and standard R,G,B values.

78. The apparatus of claim 75 further comprising means for approximating average values for R,G,B channels for the candidate borderline pixel based on R,G,B values for a corresponding borderline pixel of one or more previously scanned images, and setting the approximated R,G,B average values as R,G,B threshold values.

79. The apparatus of claim 75 further comprising means for retrieving borderline pixel data from one or more previously scanned images.

80. The apparatus of claim 75 further comprising means for using the borderline pixel data to determine borderline pixel data for one or more subsequently scanned images.

81. The apparatus of claim 75 further comprising means for recording the location of the one or more borderline pixels when the R,G,B levels of the pixel are smaller than the R,G,B threshold values.

82. The apparatus of claim 75 further comprising finding a difference between the candidate borderline pixel R,G,B values and standard R,G,B values for more than one candidate borderline pixels of the scanned image.

83. The apparatus of claim 75 further comprising means for approximating the R,G,B average values for the one or more candidate borderline pixels by averaging candidate borderline pixel R,G,B values with R,G,B values for one or more corresponding borderline pixels of one or more previously scanned images.

84. The apparatus of claim 75 further comprising means for determining whether the R,G,B average values of the pixel and R,G,B average values of one or more corresponding pixels of one or more previously scanned images are smaller than a predetermined value.

85. The apparatus of claim 84 further comprising means for updating the threshold R,G,B values by a sum of the approximated R,G,B average values and a weight default value when the R,G,B average values and R,G,B average values of one or more corresponding pixels of one or more previously scanned images are smaller than a predetermined value.

86. The apparatus of claim 75 further comprising means for determining whether the threshold R,G,B values of the pixel and threshold R,G,B values of one or more corresponding pixels of one or more previously scanned images are smaller than a predetermined value.

87. The apparatus of claim 86 further comprising means for updating the threshold R,G,B values by a sum of the approximated R,G,B average values and a weight default value when the threshold R,G,B values and threshold R,G,B values of one or more corresponding pixels of one or more previously scanned images are smaller than a predetermined value.

88. A computer-readable storage medium whose contents cause a computing system to perform a method for dynamically refining the location of one or more borderline pixels of a scanned image, the method comprising:
    determining a location of one or more candidate borderline pixels of a scanned image;
    approximating average values for R,G,B channels for the one or more candidate borderline pixels based on R,G,B values for one or more corresponding borderline pixels of one or more previously scanned images, and setting the approximated R,G,B average values as R,G,B threshold values; and
    determining that a candidate borderline pixel is a borderline pixel when the R,G,B levels of the pixel are smaller than the R,G,B threshold values.

89. A computer-readable storage medium containing instructions stored thereof that, if executed, result in:
    determining the locations of borderline pixels for a current scanned image, said borderline pixels being background pixels that circumscribing an image within an Area of Interest (AOI Image);
    approximating average values for each R,G,B channel of all of said borderline pixels based on scanned images, and setting said approximated R,G,B average values as R,G,B threshold values of said borderline pixels;
    determining an attribute of each pixel of said current scanned image based on said R,G,B threshold values;
    determining a current pixel as a borderline pixel and recording the position of said pixel when the R,G,B levels of said current pixel are smaller than said R,G,B threshold values;
    repeating said determining a current pixel as a borderline pixel and recording the position of said pixel for each pixel on said current scanned image; and
    cropping an AOI image within a crop range defined by each of said borderline pixel of said current scanned image.

90. An apparatus for auto-cropping scanned images, comprising:
    a component that determines the locations of borderline pixels for a current scanned image, said borderline pixels being background pixels that circumscribe an image within an Area of Interest (AOI Image);
    a component that approximates average values for each R,G,B channel of all of said borderline pixels based on scanned images, and sets said approximated R,G,B average values as R,G,B threshold values of said borderline pixels;
    a component that determines an attribute of each pixel of said current scanned image based on said R,G,B threshold values;
    a component that determines a current pixel as a borderline pixel and records the position of said pixel when the R,G,B levels of said current pixel are smaller than said R,G,B threshold values;
    a component that operates said component that determines a current pixel as a borderline pixel and records the position of said pixel on each pixel on said current scanned image; and
    a component that crops an AOI image within a crop range defined by each of said borderline pixel of said current scanned image.

* * * * *